US012651219B2

(12) United States Patent
Suryadi et al.

(10) Patent No.: US 12,651,219 B2
(45) Date of Patent: Jun. 9, 2026

(54) DEVICES, SYSTEMS, AND METHODS FOR VALIDATING DRILLING EQUIPMENT

(71) Applicant: Schlumberger Technology Corporation, Sugar Land, TX (US)

(72) Inventors: Hendrik Suryadi, Abu Dhabi (SA); Hui Jin, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 17 days.

(21) Appl. No.: 18/664,581

(22) Filed: May 15, 2024

(65) Prior Publication Data

US 2024/0394621 A1     Nov. 28, 2024

Related U.S. Application Data

(60) Provisional application No. 63/504,624, filed on May 26, 2023.

(51) Int. Cl.
*G06Q 10/06* (2023.01)
*E21B 47/08* (2012.01)
*G06Q 10/0631* (2023.01)

(52) U.S. Cl.
CPC ....... *G06Q 10/06313* (2013.01); *E21B 47/08* (2013.01)

(58) Field of Classification Search
None
See application file for complete search history.

(56) References Cited

U.S. PATENT DOCUMENTS

| | | | | |
|---|---|---|---|---|
| 11,521,138 | B1* | 12/2022 | Geislinger | C22B 3/08 |
| 2008/0066072 | A1* | 3/2008 | Yurekli | G06Q 10/06 |
| | | | | 718/104 |
| 2013/0292110 | A1* | 11/2013 | Fraser | E21B 7/061 |
| | | | | 166/321 |
| 2018/0260245 | A1* | 9/2018 | Smith | G06F 15/163 |
| 2019/0080271 | A1* | 3/2019 | Pei | G06F 16/90335 |
| 2020/0126386 | A1* | 4/2020 | Michalopulos | G06T 17/00 |
| 2022/0035374 | A1* | 2/2022 | Zheng | G05D 1/69 |
| 2024/0289523 | A1* | 8/2024 | Menand | G06F 30/20 |

OTHER PUBLICATIONS

Li et al. (Li, H.; Wang, R. Research on a Measurement Method for Downhole Drill String Eccentricity Based on a Multi-Sensor Layout. Sensors 2021, 21, 1258. https://doi.org/10.3390/s21041258, pp. 1-24, Feb. 10, 2021).*

* cited by examiner

*Primary Examiner* — Matthew D Henry
(74) *Attorney, Agent, or Firm* — Kyle R. Miiller

(57) ABSTRACT

A validation engine may receive first drilling equipment properties for a first plurality of drilling equipment used in a section of a wellbore. A validation engine may, based on the first drilling equipment properties, identify first wellbore properties for the section of the wellbore. A validation engine may receive second drilling equipment properties for a second plurality of drilling equipment used in the section of the wellbore. A validation engine may validate that the second plurality of drilling equipment is usable in the section of the wellbore based at least in part on a comparison between the second drilling equipment properties and the first wellbore properties.

12 Claims, 12 Drawing Sheets

744

Receive first drilling equipment properties for a first plurality of drilling equipment — 746

Identify first wellbore properties — 748

Receive second drilling equipment properties for a second plurality of drilling equipment — 750

Validate that the second drilling equipment is usable — 752

854

Receive a drilling plan for a wellbore, the drilling plan including a plurality of drilling equipment sets operating in sequential order — 856

Generate a dynamic wellbore geometry model — 858

Validate, in the sequential order, each drilling equipment set — 860

900

Memory 903

Instructions 905

Data 907

Processor 901

Communication Interface(s) 909

Input Device(s) 911

Output Device(s) 913

Display Device 915

Display Controller 917

919

DEVICES, SYSTEMS, AND METHODS FOR VALIDATING DRILLING EQUIPMENT

CROSS-REFERENCE TO RELATED APPLICATIONS

This application claims priority to and the benefit of U.S. Provisional Patent Application No. 63/504,624, filed May 26, 2023, which is incorporated herein by reference in its entirety.

BACKGROUND OF THE DISCLOSURE

Many natural resources are accessible located underground. Such natural resources include water reservoirs and hydrocarbon reservoirs such as natural gas and oil. To access these natural resources, downhole drilling systems may drill a wellbore along a trajectory to a target location, formation, or geological feature. To assist in the planning of the drilling of the wellbore, a drilling system may prepare simulations and projections to drill the wellbore, including simulations and projections of the drilling equipment used to drill the wellbore.

SUMMARY

In some aspects, the techniques described herein relate to a method. A drilling model validation engine receives first drilling equipment properties for a first plurality of drilling equipment used in a section of a wellbore. Based on the first drilling equipment properties, the drilling model validation engine identifies first wellbore properties for the section of the wellbore. The drilling model validation engine receives second drilling equipment properties for a second plurality of drilling equipment used in the section of the wellbore. The drilling model validation engine validates that the second plurality of drilling equipment is usable in the section of the wellbore based at least in part on a comparison between the second drilling equipment properties and the first wellbore properties.

In some aspects, the techniques described herein relate to a method. A drilling model validation engine receives a drilling plan for a wellbore. The drilling plan includes a plurality of drilling equipment sets operating in a sequential order. The drilling model validation engine generates a dynamic wellbore geometry model. The dynamic wellbore geometry model includes a plurality of states based on the plurality of drilling equipment sets. Each state of the plurality of states is associated with an associated drilling equipment set of the plurality of drilling equipment sets. The drilling model validation engine validates, in the sequential order, each drilling equipment set of the plurality of drilling equipment sets based on a comparison between a state of the plurality of states and a drilling equipment set of the plurality of drilling equipment sets that operates in the state of the plurality of states.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure may be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 through FIG. 2-4 are representations of a drilling plan being validated by a validation engine, according to at least one embodiment of the present disclosure;

FIG. 3 is a representation of a dynamic wellbore geometry model, according to at least one embodiment of the present disclosure;

FIG. 4 is a representation of a dynamic wellbore geometry model, according to at least one embodiment of the present disclosure;

DETAILED DESCRIPTION

This disclosure generally relates to devices, systems, and methods for validating drilling equipment used in a drilling plan for a wellbore. A wellbore plan may include multiple units of drilling equipment. A drilling model validation engine may build a dynamic wellbore geometry model using the drilling equipment from the drilling plan. The drilling plan may include a sequential order of the use of the drilling equipment. The dynamic wellbore geometry model may be built sequentially using the sequential order of the drilling plan. Subsequent units of drilling equipment may be modeled in the dynamic wellbore geometry model. A validation engine may validate whether the drilling equipment is operable in the dynamic wellbore geometry model. In this manner, the drilling model validation engine may help to determine whether the drilling equipment is usable as part of the wellbore plan. This may help to ensure that the drilling plan is accurate, thereby improving the efficiency of the drilling system and reducing and/or preventing improper equipment from being used while drilling the wellbore.

In accordance with at least one embodiment of the present disclosure, the validation engine may generate a validation score for a particular unit of drilling equipment and/or a particular drilling equipment set. The validation score may be representative of whether the drilling equipment is usable in the wellbore based on the dynamic wellbore geometry model. In some embodiments, the validation score may be binary, and indicative of whether the drilling equipment is usable or not. In some embodiments, the validation score may have multiple scores. For example, the validation score may include a "traffic light" model, including gradations associated with a color, including red which is representative of the drilling equipment not usable, green which is representative of the drilling equipment being usable, and yellow, which is representative of the drilling equipment being usable, but with some risk. In this manner, the drilling manager may determine whether to use a particular unit of drilling equipment or equipment set based on the validation score.

Figure 1:
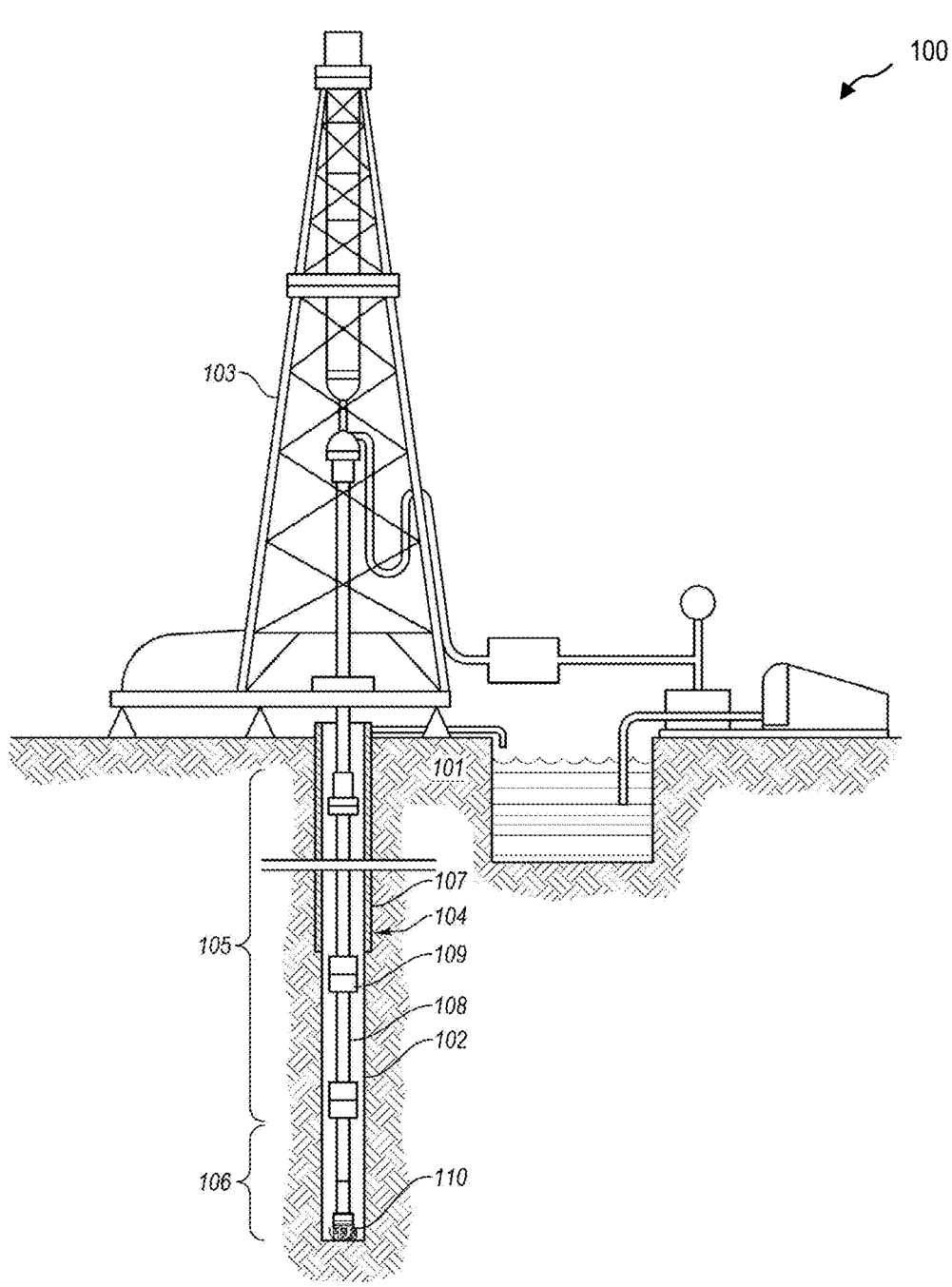
FIG. 1 is a representation of a drilling system for drilling an earth formation to form a wellbore; according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of the drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

In accordance with at least one embodiment of the present disclosure, a drilling plan may be prepared for the wellbore 102 prior to the wellbore 102 being drilled. The drilling plan may include details of the drilling system used to drill the wellbore 102. For example, the drilling plan may include details of the drilling equipment, such as drilling tool assembly 104, the drill string 105, the BHA 106, the drill pipe 108, the tool joints 109, the bit 110, and any other drilling equipment, and combinations thereof. The drilling plan may include details of the wellbore 102, including wellbore diameter, information regarding the casing 107, such as casing inner diameter, casing outer diameter, casing material, and so forth.

The drilling plan may include a sequential order of the use of the various drilling equipment and drilling equipment sets. A drilling equipment set may be a particular combination of units of drilling equipment. For example, the entire wellbore 102 may not be drillable with a single drilling equipment set. In some examples, a first drilling equipment set may drill a wellbore having a first diameter. A second plurality of drilling equipment set may ream the wellbore to a second diameter. A third drilling equipment set may include a casing installation system to install the casing 107. Each of the different drilling equipment sets may have different equipment properties. For example, each of the different drilling equipment sets may have a different equipment diameter, different operating parameters (e.g., WOB, RPM, drilling fluid pressure), any other equipment properties, and combinations thereof.

In some situations, the drilling plan may include a drilling equipment set having at least one unit of drilling equipment that is not operable in the scheduled portion of the wellbore. For example, a unit of drilling equipment may have an equipment diameter that is larger than the wellbore diameter at a particular sequential state of the drilling plan.

In accordance with at least one embodiment of the present disclosure, a validation engine may determine whether the drilling equipment or drilling equipment set is usable or operable in the wellbore at the time or in the state of the wellbore in which the equipment is to be used. The validation engine may generate a dynamic wellbore geometry model. The dynamic wellbore geometry model may include multiple states. The different states may be based on the sequential plan of the drilling plan. In some embodiments, the different states may be based on the drilling equipment used during that portion of the drilling plan. In the next portion of the drilling plan, the validation engine may determine whether the proceeding drilling equipment is usable and/or operable within the state of the dynamic wellbore geometry model. For example, the validation engine may determine whether the equipment diameter of the drilling equipment is greater than or equal to the wellbore diameter in the state of the dynamic wellbore geometry model in which the drilling equipment will be used.

In some embodiments, the validated drilling plan may be used to drill the wellbore 102. By validating the drilling plan, the drilling equipment used while drilling the wellbore 102 may be usable within the wellbore 102, thereby reducing or preventing equipment mismatch between the wellbore 102 and the drilling equipment.

FIG. 2-1 through FIG. 2-4 are representations of a drilling plan being validated by a validation engine, according to at least one embodiment of the present disclosure. A validation engine may generate a dynamic wellbore geometry model 212. The dynamic wellbore geometry model 212 may include sequential states of the wellbore geometry 214. The wellbore geometry 214 may include any geometrical details of the wellbore that may be drilled by a drilling equipment set (collectively 216). For example, the wellbore geometry 214 may include a wellbore diameter 218. The wellbore geometry 214 of the dynamic wellbore geometry model 212 may be defined for a wellbore segment 220. The wellbore segment 220 may be a portion of the dynamic wellbore geometry model 212 that has similar geometry and/or a similar drilling process used to drill the wellbore.

In accordance with at least one embodiment of the present disclosure, the details of the wellbore segment 220 of the dynamic wellbore geometry model 212 may be based on the drilling equipment set 216 used to drill the wellbore segment 220 of the dynamic wellbore geometry model 212. The drilling equipment set 216 may include various units of drilling equipment. The drilling equipment set 216 may have an equipment diameter 222. The equipment diameter 222 may be the largest diameter of any unit of drilling equipment in the drilling equipment set 216.

In the embodiment shown, a first drilling equipment set 216-1 includes a bit 210. The bit 210 has a bit diameter that is the equipment diameter 222. As an illustrative example, the first drilling equipment set 216-1 shown is used to advance a depth of the wellbore over the wellbore segment 220. The validation engine may generate the dynamic wellbore geometry model 212 for the wellbore segment 220 using the first drilling equipment set 216-1. As discussed herein, the drilling plan is sequential. Using the first drilling equipment set 216-1 shown in FIG. 2-1, the validation engine may generate a state of the dynamic wellbore geometry model 212. The state of the dynamic wellbore geometry model 212 may be the geometry of the wellbore as drilled by the first drilling equipment set 216-1. The state of the dynamic wellbore geometry model 212 may be maintained until a subsequent or a proceeding drilling equipment set 216 is used to further drill the wellbore.

In accordance with at least one embodiment of the present disclosure, the dynamic wellbore geometry model 212 may be maintained as an array stored in the validation engine. At the start of the drilling plan, the array of the dynamic wellbore geometry model 212 may be empty. In an example illustrated below, and after the end of the first run with the first drilling equipment set 216-1, the array of the dynamic wellbore geometry model 212 may be updated with the first state as shown:

"start_md": 0.0, "end_md": 1000,
"outside_diameter": drilled hole size from the drillstring of the first drilling run,
"inside_diameter": drilled hole size from the drillstring of the first drilling run,
"drift_diameter": drilled hole size from the drillstring of the first drilling run,
"wellbore_profile_segment_type": "openhole"

In the exemplary first state, the "start_md" may be the start depth of the wellbore segment 220, the "end_md" may be the end depth of the wellbore segment 220, the "outside_diameter" may be the outer diameter of the wellbore in the wellbore segment 220, or the diameter of the wellbore to the bare rock, the "inside_diameter" may be the total inside diameter of the wellbore, including any casing or other wellbore structures, the "drift_diameter" may be the diameter accounting for variability in the wellbore geometry, such as tortuosity, ledging, and other elements that adjust the functional diameter of the wellbore, and "wellbore_profile- _segment_type" may be the type of the wellbore, such as an open hole, a cased hole, or any other type of wellbore.

As may be understood, in the first state shown, the outside_diameter and the inside_diameter may be the same, and may be based on the equipment diameter 222. The drift_diameter may reduce the effective wellbore diameter based on wellbore variability.

Figures 1, 2:
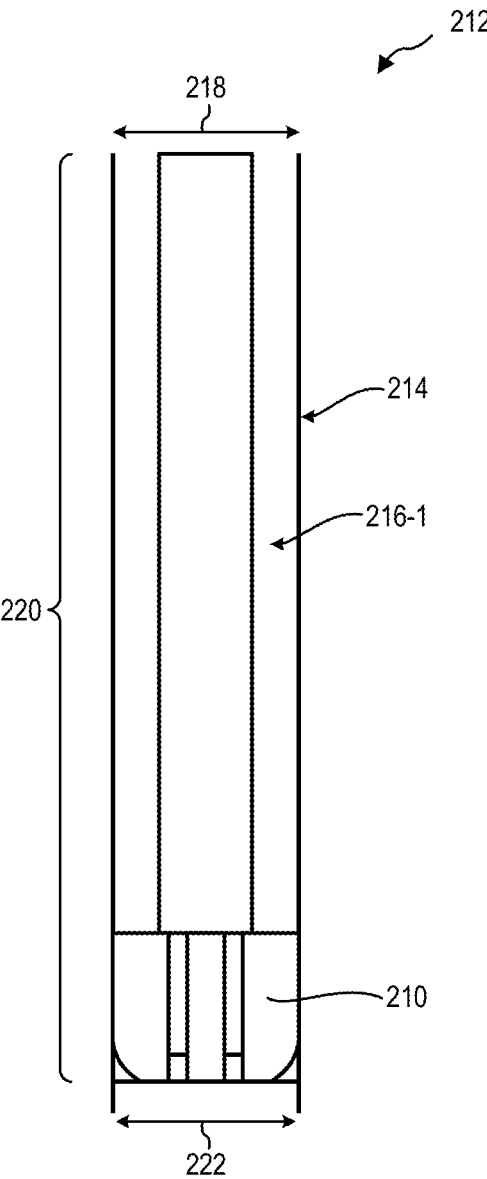
Figure 2:
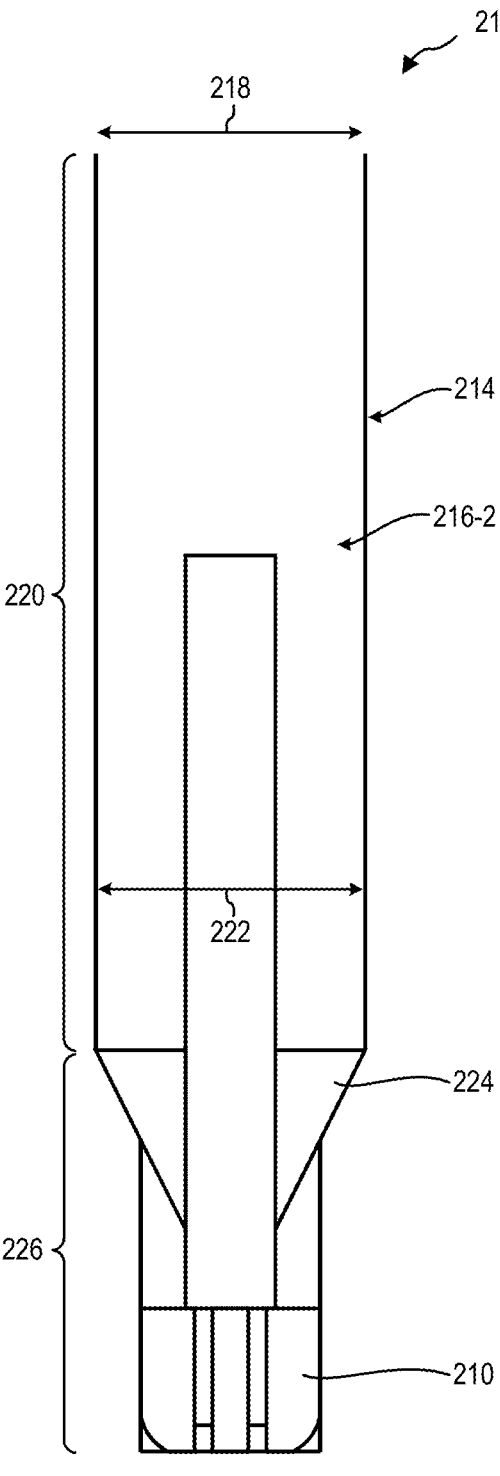

In FIG. 2-2, the dynamic wellbore geometry model 212 is dynamically updated when a second plurality of drilling equipment set 216-2 is used on the wellbore segment 220 of the wellbore. The second plurality of drilling equipment set 216-2 may be a subsequent or a proceeding drilling equipment set 216 to the first drilling equipment set 216-1, and the first drilling equipment set 216-1 may be a preceding drilling equipment set 216 to the second plurality of drilling equipment set 216-2. A subsequent or a proceeding drilling equipment set 216 may be a drilling equipment set 216 that is used after a preceding drilling equipment set 216, based on the sequential order of the drilling plan. A preceding drilling equipment set 216 may be a drilling equipment set 216 that is used before a subsequent or a proceeding drilling equipment set 216.

In the embodiment shown, the second plurality of drilling equipment set 216-2 includes a bit 210 and a reamer 224. The reamer 224 may have a larger diameter than the bit 210. As discussed herein, the equipment diameter 222 may be the largest diameter of the drilling equipment set 216, and so the equipment diameter 222 of the second plurality of drilling equipment set 216-2 may be the reamer diameter of the reamer 224.

After the second plurality of drilling equipment set 216-2 has drilled, performed operations on, or otherwise passed through the wellbore segment 220, the validation engine may update the dynamic wellbore geometry model 212 based on the second plurality of drilling equipment set 216-2. This may update the dynamic wellbore geometry model 212 to a second state that occurs sequentially after the first state shown in FIG. 2-1. The second state of the dynamic wellbore geometry model 212 may have a wellbore diameter 218 that is the same as the equipment diameter 222 (e.g., the reamer diameter of the reamer 224 of the second plurality of drilling equipment set 216-2). The validation engine may update the state array of the dynamic wellbore geometry model 212 to:

"start_md": 0.0, "end_md": 1000,
"outside_diameter": reamed hole size from the reamer of the second drilling run,
"inside_diameter": reamed hole size from the reamer of the second drilling run,
"drift_diameter": reamed hole size from the reamer of the second drilling run,
"wellbore_profile_segment_type": "openhole"

As may be seen in the second state of the dynamic wellbore geometry model 212, the state of the wellbore segment 220 may be updated to have diameter and other states based on the second plurality of drilling equipment set 216-2. In the embodiment shown, the second plurality of drilling equipment set 216-2 is advancing the wellbore in a second wellbore segment 226. The dynamic wellbore geometry model 212 may be updated with a state for the second wellbore segment 226. As may be understood, the dynamic wellbore geometry model 212 may be dynamically updated to adjust the state of a segment that was modified in the associated run, and the dynamic wellbore geometry model 212 may be dynamically updated to add a state for newly drilled segments. In this manner, the dynamic wellbore geometry model 212 may be a dynamic model, that is updated with every equipment set that is used to drill the wellbore. The dynamic wellbore geometry model 212 may be used by wellbore planning and modeling systems to analyze the wellbore at different stages of drilling the wellbore.

Figures 2, 3:
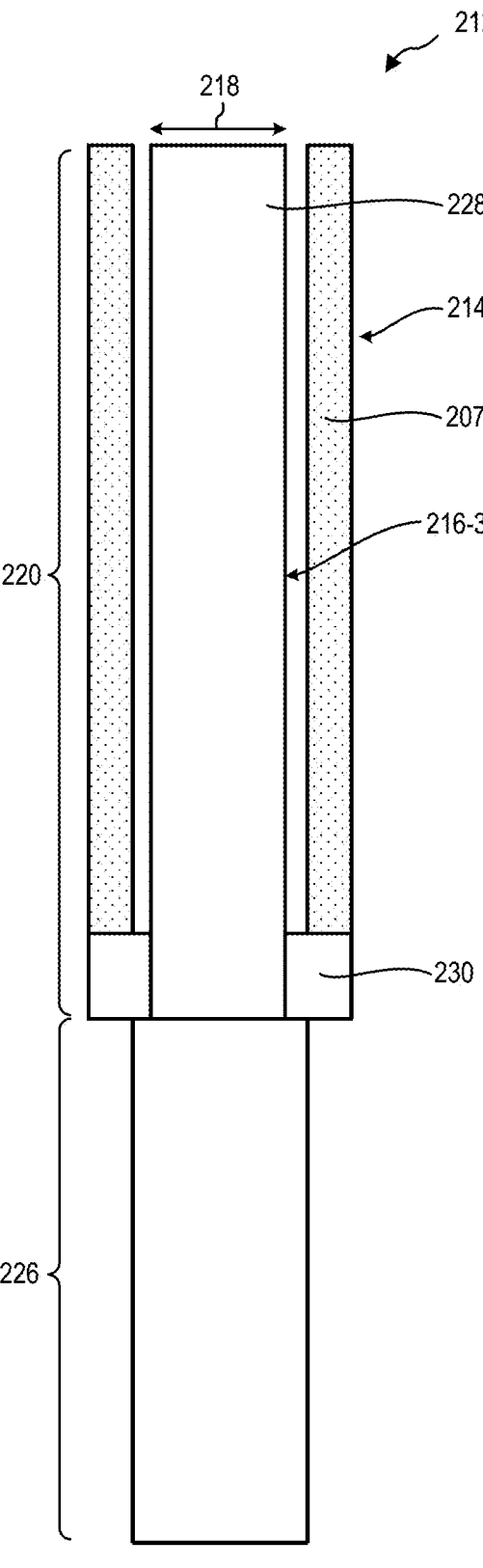

In FIG. 2-3, a third drilling equipment set 216-3 may be used to install a casing 207 in the wellbore. The third drilling equipment set 216-3 may include a casing liner installer 228 that may direct a casing liner down into the wellbore. An expandable packer 230 may seal the bottom of the casing liner to allow the annular space between the casing liner and the wellbore wall to be filled with cement or cementitious grout. This may form the casing 207.

Using the third drilling equipment set 216-3, the validation engine may generate a third state of the dynamic wellbore geometry model 212. The third state of the dynamic wellbore geometry model 212 may include a wellbore diameter 218 that may be representative of the inner diameter of the casing 207 along the wellbore segment 220. In some embodiments, the dynamic wellbore geometry model 212 may include the wellbore geometry of the second wellbore segment 226. However, it should be understood that, while the second wellbore segment 226 is described and illustrated with respect to the dynamic wellbore geometry model 212, the dynamic wellbore geometry model 212 may include more or fewer segments than those illustrated in the dynamic wellbore geometry model 212. For example, the dynamic wellbore geometry model 212 may include 1, 2, 3, 4, 5, 6, 7, 8, 9, 10, 15, 20, 25, 30, 40, 50, 100, 200, 500, 1,000 or more segments, based on the drilling plan and the planned wellbore.

The validation engine may generate the third state of the wellbore segment 220 of the dynamic wellbore geometry model 212 based on the installation of the casing 207.

The validation engine may update the state array of the dynamic wellbore geometry model 212 to:

"start_md": 0.0, "end_md": 1000,

"hole_diameter": reamed hole size from the reamer of the second drilling run,

"outside_diameter": outside diameter of the casing

"inside_diameter": inside diameter of the casing,

"drift_diameter": drift diameter of the casing,

"wellbore_profile_segment_type": "cased hole"

The state array may be updated with any other relevant state information. While a single casing is shown in the illustrated embodiment, it should be understood that the drilling plan may include two or more layers of casing in the same segment. The dynamic wellbore geometry model 212 may be updated sequentially as each casing is drilled and/or installed. In some embodiments, the state array may be updated sequentially to include information regarding the casing layers. An example state array for multiple casings may be:

"start_md": 0.0,

"end_md": 1000,

"outside_diameter": second casing's outside diameter,

"inside_diameter": second casing's inside diameter,

"drift_diameter": second casing's drift diameter,

"hole_diameter": first casing's inside diameter,

"hole_type": "casedhole",

"wellbore_profile_segment_type": "casedhole"

In this example state array, the volume of the annular space for the second casing may be estimated using the "hole_diameter" metric. The state array may include any number of these nested hole diameter and hole type information sets to provide accurate and relevant information to drilling operators and/or drilling planners.

In the embodiments illustrated and discussed with respect to FIG. 2-1 to FIG. 2-3, the drilling plan resulted in three states of the dynamic wellbore geometry model 212. However, it should be understood that the drilling plan may result in any number of states of the dynamic wellbore geometry model 212, including 1, 2, 3, 4, 5, 6, 7, 8, 9, 10, 15, 20, 25, 30, 40, 50, 100, 200, 500, 1,000 or more states. Because the dynamic wellbore geometry model 212 is dynamic, the dynamic wellbore geometry model 212 may be updated with each change in the wellbore geometry 214 of the wellbore. In some embodiments, the dynamic wellbore geometry model 212 may be updated with each change in the drilling equipment set 216, including changes in a single unit of drilling equipment of the drilling equipment set 216.

Figures 2, 3, 4:
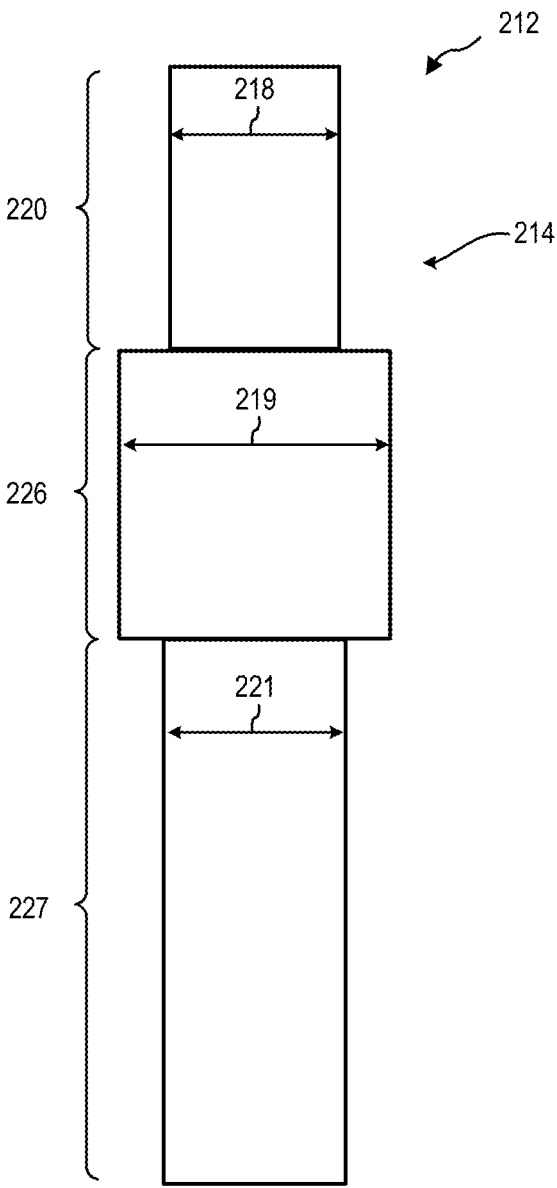
Figure 3:
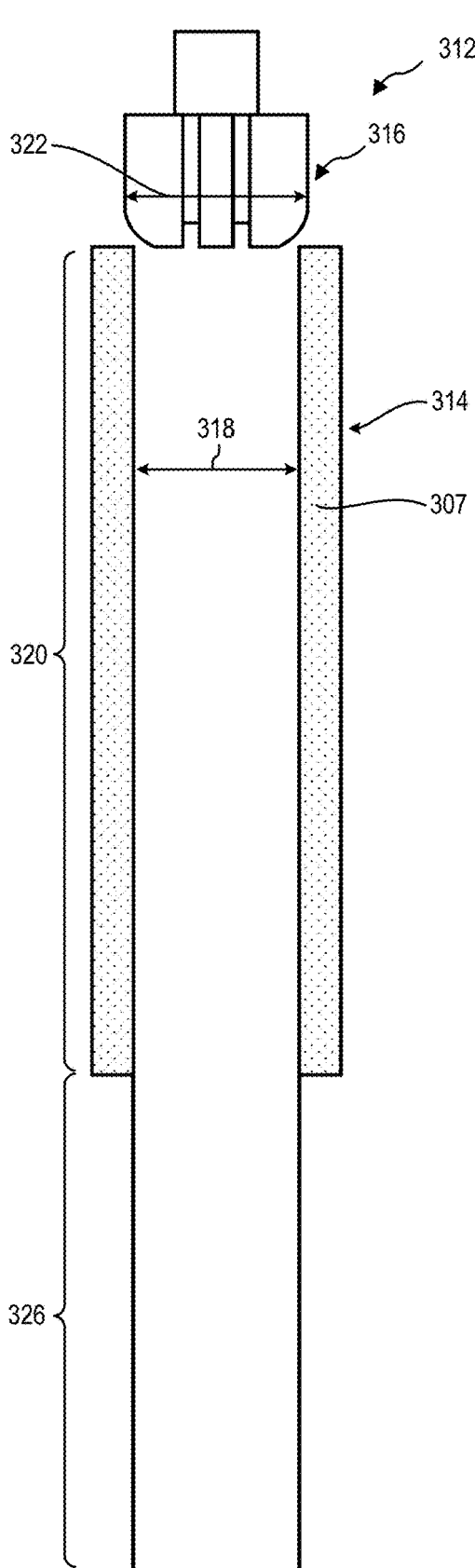
Figure 4:
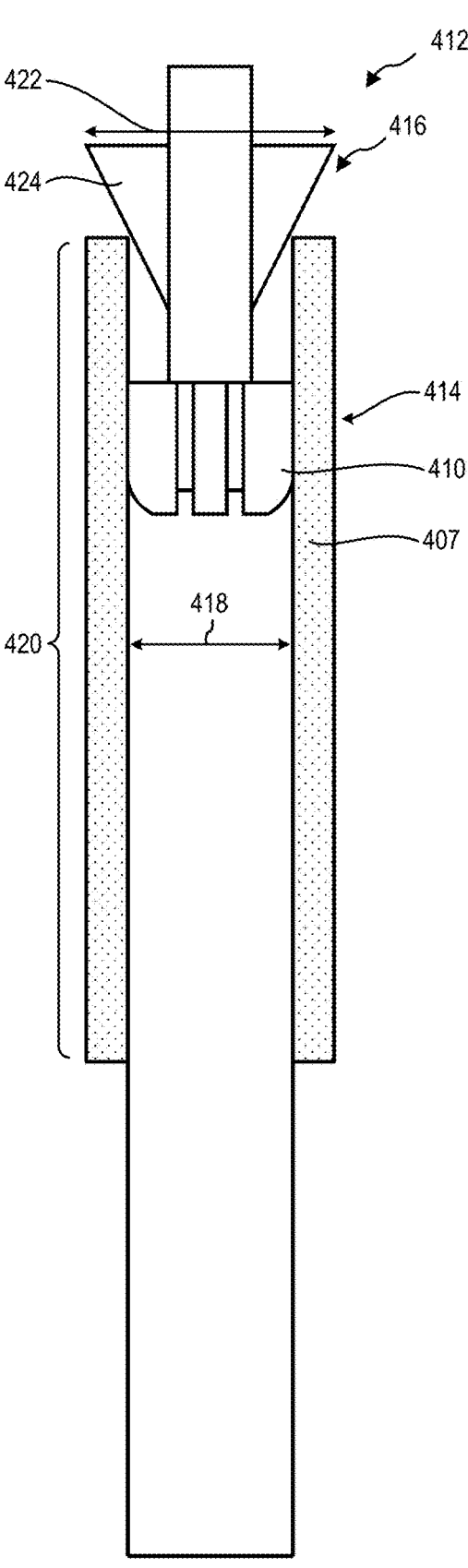

In FIG. 2-4 the dynamic wellbore geometry model 212 has a wellbore geometry 214 with multiple wellbore diameters 218. For example, a first wellbore segment 220 has a first wellbore diameter 218, a second wellbore segment 226 has a second wellbore diameter 219, and a third wellbore segment 227 has a third wellbore diameter 221. As discussed herein with respect to FIG. 2-2, the drilling equipment set 216 may include a reamer 224. The reamer 224 may include a retractable reamer. For example, the reamer may be retracted for a portion of the drilling operation and the reamer 224 may be expanded for a portion of the drilling operation.

The dynamic wellbore geometry model 212 may include the wellbore geometry 214 that includes different diameters based on the plan for the reamer 224 to ream the wellbore. For example, the first wellbore diameter 218 may be less than the second wellbore diameter 219. During drilling and reaming operations, the reamer may trip through the first wellbore segment 220 in the retracted configuration. Therefore, the reamer may fit through the first wellbore segment 220. In the second wellbore segment 226, the reamer may expand to increase the diameter of the wellbore to the second wellbore diameter 219. In the third wellbore segment 227, the reamer may retract again, allowing the reamer to pass through the third wellbore segment 227 with the third wellbore diameter 221. In this manner, the dynamic wellbore geometry model 212 may incorporate different wellbore segments having different wellbore diameters based on the operating status of the reamer.

FIG. 3 is a representation of a dynamic wellbore geometry model 312 having a wellbore geometry 314 with a wellbore diameter 318 based on a preceding drilling equipment set used to attain the wellbore geometry 314 at the current state of the drilling plan, according to at least one embodiment of the present disclosure. The dynamic wellbore geometry model 312 includes a wellbore geometry 314 having a casing 307 installed over a wellbore section 320. However, it should be understood that the wellbore geometry 314 shown is exemplary, and any wellbore geometry 314 may be used, including open hole, multiple sets of casing, and so forth.

The drilling plan may include a drilling equipment set 316 to be used in the dynamic wellbore geometry model 312. As discussed herein, the validation engine may validate whether the drilling equipment set 316 may be used in the wellbore, or in the current state of the dynamic wellbore geometry model 312 having the current wellbore geometry 314. To validate whether the drilling equipment set 316 is usable in the wellbore, the validation engine may compare the dimensions of the drilling equipment set 316 with the wellbore geometry 314 of the associated state of the dynamic wellbore geometry model 312. As discussed herein, the dynamic wellbore geometry model 312 is dynamically updated with every drilling equipment set and other drilling operation performed in the wellbore. Indeed, the wellbore geometry 314 shown may not be the final wellbore geometry of the wellbore, but may be an intermediate state based on the previous set of drilling equipment used to attain the current state. When the new drilling equipment set 316 is to be used in the wellbore, the drilling equipment set 316 may be validated to ensure that it is usable within the wellbore based on the state of the wellbore in which the drilling equipment set 316 will be used.

In accordance with at least one embodiment of the present disclosure, to validate the drilling equipment set 316, the validation engine may compare an equipment diameter 322 of the drilling equipment set 316 to the wellbore diameter 318. As may be understood, if the dynamic wellbore geometry model 312 is greater than the wellbore diameter 318, then the drilling equipment set 316 is unusable in the wellbore because the drilling equipment set 316 may not physically pass through the wellbore. In the embodiment shown, the equipment diameter 322 of the drilling equipment set 316 may be larger than the wellbore diameter 318. The validation engine may generate a low validation score indicating that the drilling equipment set 316 is unable to pass through the wellbore. The validation engine may transmit the validation score to the drilling planners indicating that the drilling equipment set 316 is not usable in the wellbore. The drilling planners may then adjust the drilling plan to ensure that the drilling equipment set 316 is usable in the wellbore.

The validation score may be generated for the drilling equipment set 316 for a particular wellbore section 320 at a particular state of the dynamic wellbore geometry model 312. The validation score may be different for different sections. For example, the validation score for the wellbore section 320 may be different than the validation score for a second wellbore section 326. The validation score may include the location of the wellbore segment. In some embodiments, the validation score may include the wellbore state array and may identify which portion of wellbore geometry 314 in the wellbore state array is causing the low validation score. For example, in the embodiment shown in FIG. 3, the validation engine may generate a validation score for the wellbore section 320. The validation engine may identify that the wellbore diameter 318 is the inner diameter of the casing 307 in the wellbore section 320. The validation score may be based on the equipment diameter 322 of the drilling equipment set 316, and may identify that the equipment diameter 322 may be larger than the wellbore diameter 318, for the wellbore section 320. The accurate and detailed information provided by the validation engine may help drill planners make adjustments to the drilling plan that are directed to resolving the low validation score. Because the validation score is detailed, the resolution to the low validation score may be tailored to impact the state of the dynamic wellbore geometry model 312 at issue. This may help to improve the efficiency and/or effectiveness of the drilling plan.

As discussed herein, the validation engine may generate a validation score for each wellbore section of the wellbore. In some embodiments, the validation engine may begin generating validation scores at the top of the wellbore. In some embodiments, if an upper wellbore section located above a lower wellbore section has a low validation score, then the validation engine may stop validating the drilling equipment set 316 in the dynamic wellbore geometry model 312 for the lower wellbore sections. This may help to reduce the processing load of the validation engine by not validating the drilling equipment set 316 in portions of the dynamic wellbore geometry model 312 that the drilling equipment set 316 cannot physically reach or is not otherwise suited for.

In some embodiments, the validation engine may generate a validation score for the entire drilling equipment set 316. In some embodiments, the validation engine may generate a validation score for a particular unit of drilling equipment in the drilling equipment set 316. For example, the drilling equipment set 316 may include a bit having a bit diameter that is the largest diameter of the drilling equipment set 316. The validation engine may analyze the diameter of each unit of drilling equipment in the drilling equipment set 316 and compare the diameter of each unit of the drilling equipment to the wellbore diameter 318. The validation engine may generate a validation score for each of the units of drilling equipment. In this manner, the drill planner may identify which unit of drilling equipment should be reviewed and/or adjusted based on the validation scores for the individual units of drilling equipment.

In some embodiments, the validation engine may validate the drilling equipment set 316 for the entire dynamic wellbore geometry model 312 to provide an indication of how the drilling equipment set 316 may perform in each portion of the dynamic wellbore geometry model 312, even portions which the drilling equipment set 316 cannot currently reach. The drill planners may adjust the drilling plan in any number of ways, including an adjustment to the equipment diameter 322 of the drilling equipment set 316, an adjustment to the wellbore diameter 318 of the wellbore geometry 314 in the wellbore section 320, an adjustment to the casing thickness of the casing 307, an adjustment to the particular equipment used in the drilling equipment set 316, any other adjustment, and combinations thereof. By validating the drilling equipment set 316 over the whole dynamic wellbore geometry model 312, the validation engine may prepare a validation score for the drill planners that may be used to make changes that impact the entire wellbore, and not just a single analyzed wellbore section 320.

In the embodiment shown, the validation engine may be configured to compare the equipment diameter 322 to the wellbore diameter 318 to generate the validation score. In accordance with at least one embodiment of the present disclosure, the validation engine may analyze any equipment property of the drilling equipment set 316 as operated in the wellbore section 320. For example, the validation engine may analyze how the simulated drilling parameters may impact the drilling equipment set 316, such as weight-on-bit (WOB), torque-on-bit (TOB), drilling fluid pressure, drilling fluid flow rate, rotational rate in rotations per minute (RPM), rate-of-penetration (ROP), any other drilling parameter, and combinations thereof. The validation engine may validate that the simulated drilling parameters may be within operating ranges and/or operating tolerances of the drilling equipment set 316. If the drilling parameters are outside of the operating ranges and/or operating tolerances of the drilling equipment set 316, the validation engine may generate a negative validation score. In some embodiments, the validation engine may analyze the cutting structures and/or patterns of the drilling equipment set 316 to the geology of the wellbore section 320, and the validation score may be representative of how well-suited the cutting structures are to the geology of the wellbore section 320 (e.g., regarding cutter efficiency, cutter wear, cuttings buildup).

In some embodiments, the validation engine may generate a binary validation score, such as a positive score if the drilling equipment set 316 is usable in the wellbore section 320 or a negative score if the drilling equipment set 316 is not usable in the wellbore section 320. A binary score may be easily reviewed by the drill planning software and appropriate corrections may be made with little to no input by the drilling operator. The validation threshold for a particular parameter may be any threshold. For example, the validation threshold for diameter may be the wellbore diameter 318. If the equipment diameter 322 is equal to or greater than the wellbore diameter 318 (e.g., the validation threshold), then the drilling equipment set 316 receives a negative validation score. In some examples, the validation threshold may be a percentage of the wellbore diameter. If the equipment diameter 322 is within 95% (e.g., the validation threshold) of the wellbore diameter 318, then the drilling equipment set 316 may receive a negative validation score because there is still a likelihood of the drilling equipment set 316 not operating properly in the wellbore section 320. In some embodiments, the percent-based validation threshold may be any percent-based validation threshold, including 80%, 85%, 90%, 95%, 97%, 98%, 99%, or any value therebetween.

In some embodiments, the validation engine may generate a graded validation score. A graded validation score may allow the validation score to indicate whether a particular drilling equipment set 316 or unit of drilling equipment is usable in the dynamic wellbore geometry model 312 and to what degree the drilling equipment set 316 is suitable for the dynamic wellbore geometry model 312. For example, a graded validation score may indicate that one or more drilling parameters of the drilling equipment set 316 may be close to operating thresholds for the drilling equipment, which may cause increased wear on the drilling equipment set 316. In some examples, a graded validation score may indicate that the drilling equipment set 316 may have a potential to become stuck in the wellbore. Using the graded validation score, the drill planner may evaluate the risk of utilizing the drilling equipment set 316 compared to the benefits of that particular drilling equipment set 316. In this manner, the drill planner may make informed decisions based on accurate and precise information for the dynamic wellbore geometry model 312.

The graded validation score may be graded in any manner. For example, the graded validation score may include color-coded grades. The color-coded grades may be based on any color-coding scheme. In some examples, the color-coded grades may be based on a traffic light signal, with red representing a negative validation score, green representing a positive validation score, and yellow representing a caution validation score. In some examples, the color-coded grades may represent a heat-map, with variations in color on a scale between two colors representative of a level of risk associated with the drilling equipment set 316.

In some examples, the graded validation score may include a numbered validation score. For example, the graded validation score may be a percentage, with 100% representing a drilling equipment set 316 that is completely usable in the state of the dynamic wellbore geometry model 312 (e.g., has zero risk of use) and 0% representing a drilling equipment set 316 that is not useable in the state of the dynamic wellbore geometry model 312. Scores between 0% and 100% may be representations of the level of risk of use of the drilling equipment set 316 in the dynamic wellbore geometry model 312. A drill planner may review the validation score for each drilling equipment set 316 and/or each unit of drilling equipment to determine whether to maintain the drilling equipment set 316 in the drilling plan. In some examples, the graded validation score may be a number, such as a number between 1 and 10, a number between 1 and 5, or a number between any other two numbers.

In some embodiments, the drill planner may review the drilling equipment set 316 if the validation score is above or below a score threshold. For example, if the validation score is above the score threshold, the drill planner may not review the drilling equipment set 316. If the validation score is below the score threshold, the drill planner may review the drilling equipment set 316.

FIG. 4 is a representation of a dynamic wellbore geometry model 412 having a wellbore geometry 414 with a wellbore diameter 418 based on a preceding drilling equipment set used to attain the wellbore geometry 414 at the current state of the drilling plan, according to at least one embodiment of the present disclosure. The dynamic wellbore geometry model 412 includes a wellbore geometry 414 having a casing 407 installed over a wellbore section 420. However, it should be understood that the wellbore geometry 414 shown is exemplary, and any wellbore geometry 414 may be used, including open hole, multiple sets of casing, and so forth.

A validation engine may validate a drilling equipment set 416 that a drilling plan may have in the sequential order of the drilling plan. The drilling equipment set 416 may include a bit 410 and a reamer 424. In the embodiment shown, the reamer 424 may have the largest diameter of the drilling equipment set 416, resulting in the equipment diameter 422 of the drilling equipment set 416. The bit 410 may fit in the wellbore, but the reamer 424 may not fit in the wellbore. In some embodiments, the reamer 424 may fit in the wellbore if the reamer 424 removes at least a portion of the casing 407.

As discussed in further detail herein, the validation engine may validate the drilling equipment set 416 by comparing the diameter of each unit of drilling equipment in the drilling equipment set 416 to the wellbore diameter 418. In the embodiment shown, because the equipment diameter 422 is greater than the wellbore diameter 418, the validation engine may generate a negative validation score indicating that the drilling equipment set 416 is not usable in the wellbore.

In some embodiments, the reamer 424 may include a casing cutter or other element configured to remove a portion of the wellbore. The reamer 424 may include an equipment ID that identifies the reamer 424 as a casing cutter. The validation engine may determine that the reamer 424 is configured to remove a portion of the casing 407 and may generate a positive validation score for the drilling equipment set 416.

In some embodiments, the reamer 424 may be an expandable reamer. The reamer 424 may be associated with an equipment ID that identifies the reamer 424 as an expandable reamer (or other expandable downhole tool, such as an expandable stabilizer, an expandable steering tool, an expanding cutting tool, an expandable packer). The validation engine may determine that the retracted diameter of the reamer 424 may be less than the wellbore diameter 418 and the extended diameter of the reamer 424 may be greater than the wellbore diameter 418. The validation engine may determine that, as long as the reamer 424 is in the retracted state, the drilling equipment set 416 is usable in the wellbore. In some embodiments, the validation engine may reduce the validation score based on the expandable tool due to the chance for inadvertent expansion of the tool. In some embodiments, the validation score may be flagged with a flag identifying the drilling equipment set 416 as including an expandable tool.

Figure 5:
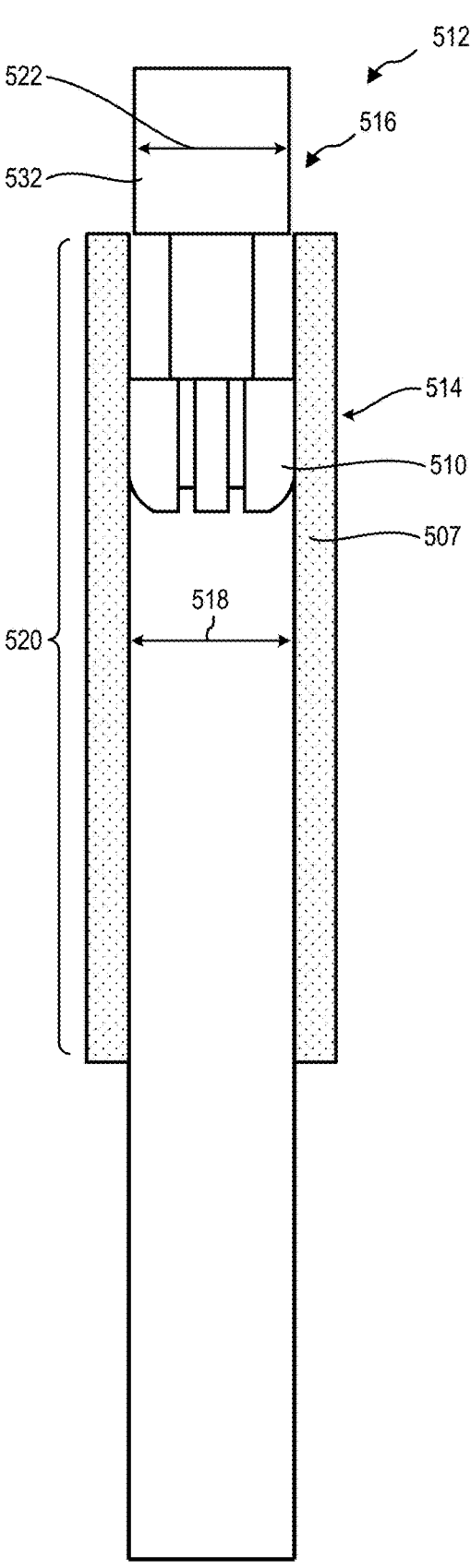
FIG. 5 is a representation of a dynamic wellbore geometry model, according to at least one embodiment of the present disclosure.

FIG. 5 is a representation of a dynamic wellbore geometry model 512 having a wellbore geometry 514 with a wellbore diameter 518 based on a preceding drilling equipment set used to attain the wellbore geometry 514 at the current state of the drilling plan, according to at least one embodiment of the present disclosure. The dynamic wellbore geometry model 512 includes a wellbore geometry 514 having a casing 507 installed over a wellbore section 520. However, it should be understood that the wellbore geometry 514 shown is exemplary, and any wellbore geometry 514 may be used, including open hole, multiple sets of casing, and so forth.

A validation engine may validate a drilling equipment set 516 used in the wellbore section 520 of the dynamic wellbore geometry model 512. The drilling equipment set 516 may include a bit 510 and a BHA tool 532. The bit 510 may have a bit diameter and the BHA tool 532 may have a tool diameter, resulting in an equipment diameter 522. In accordance with at least one embodiment of the present disclosure, the equipment diameter 522 may be slightly smaller than the wellbore diameter 518.

In some embodiments, the validation engine may provide a validation score for the drilling equipment set 516. In some embodiments, a binary validation score may indicate that the equipment diameter 522 is smaller than the wellbore diameter 518. However, depending on how much smaller the equipment diameter 522 is than the wellbore diameter 518, portions of the drilling equipment set 516 may still get stuck in the wellbore. In accordance with at least one embodiment of the present disclosure, the validation engine may generate a validation score that provides an indication of the risk of using the drilling equipment set 516 in the wellbore. The validation score may be a representation of how much smaller the equipment diameter 522 is than the wellbore diameter 518. This may allow the drill planner to determine whether the drilling equipment set 516 is usable in the wellbore.

Figure 6:
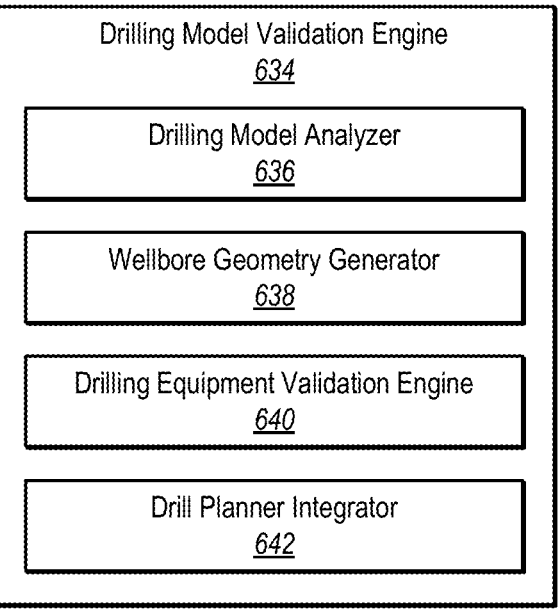
FIG. 6 is a representation of a drilling model validation engine, according to at least one embodiment of the present disclosure.

FIG. 6 is a representation of a drilling model validation engine 634, according to at least one embodiment of the present disclosure. Each of the components 636-642 of the drilling model validation engine 634 may include software, hardware, or both. For example, the components 636-642 may include one or more instructions stored on a computer-readable storage medium and executable by processors of one or more computing devices, such as a client device or server device. When executed by the one or more processors, the computer-executable instructions of the drilling model validation engine 634 may cause the computing device(s) to perform the methods described herein. Alternatively, the components 636-642 may include hardware, such as a special-purpose processing device to perform a certain function or group of functions. Alternatively, the components 636-642 of the drilling model validation engine 634 may include a combination of computer-executable instructions and hardware.

Furthermore, the components 636-642 of the drilling model validation engine 634 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 636-642 may be implemented as a stand-alone application, such as a desktop or mobile application. Furthermore, the components 636-642 may be implemented as one or more web-based applications hosted on a remote server. The components 636-642 may also be implemented in a suite of mobile device applications or "apps."

The drilling model validation engine 634 may analyze a dynamic wellbore geometry model sequentially as the dynamic wellbore geometry model is built based on the sequential drilling plan. As discussed herein, the drilling plan may include a sequential series of drilling equipment sets used to drill the wellbore. The drilling model validation engine 634 may analyze each portion of the sequential drilling plan.

The drilling model validation engine 634 may include a drilling model analyzer 636. The drilling model analyzer 636 may review the drilling plan and identify the various portions of the drilling plan. The drilling model analyzer 636 may identify the drilling equipment sets used and in which order the drilling equipment sets are used. Using the sequence of drilling equipment sets, a wellbore geometry generator 638 may generate a dynamic wellbore geometry. As discussed herein, the dynamic wellbore geometry may include a plurality of states, with each state determined by the drilling equipment used to drill the state.

A drilling equipment validation engine 640 may validate the drilling equipment sets and/or individual units of drilling equipment used in the drilling plan. For example, as discussed herein, the drilling equipment validation engine 640 may compare proceeding drilling equipment sets (including a proceeding equipment diameter) to the state in which the drilling equipment set will be used. The drilling equipment validation engine 640 may validate the drilling equipment sets based on any validation metric, such as equipment diameter and/or equipment operating parameters. The drilling equipment validation engine 640 may prepare a validation score that may be representative of how usable the drilling equipment sets are, based on the particular state in which they will be used.

A drill planner integrator 642 may submit the validation scores to the drill planner. For example, the drill planner integrator 642 may transmit the validation scores to a computation engine that may prepare the computations used in wellbore planning and other wellbore calculation systems. In some embodiments, the drill planner integrator 642 may transmit every validation score. In some embodiments, the drill planner integrator 642 may transmit validation scores that are below a validation threshold. In some embodiments, the drill planner integrator 642 may transmit validation scores to a human operator for review.

Figure 7:
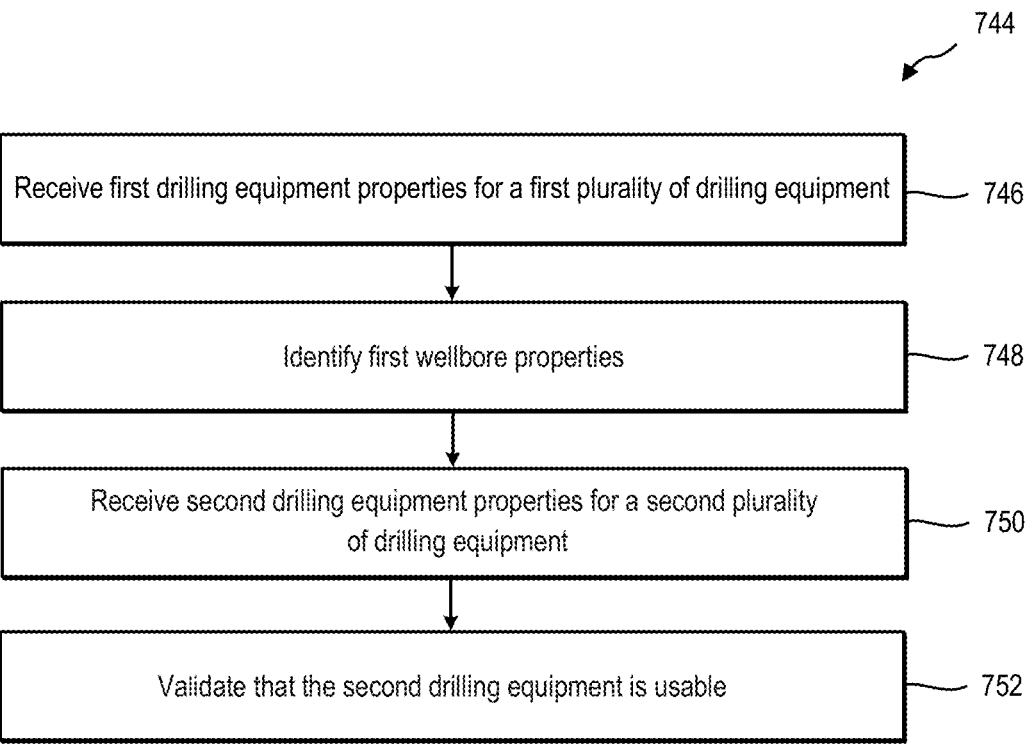
FIG. 7 illustrates a flowchart of a method for validating a drilling plan, in accordance with one at least one embodiment of the present disclosure.
Figure 8:
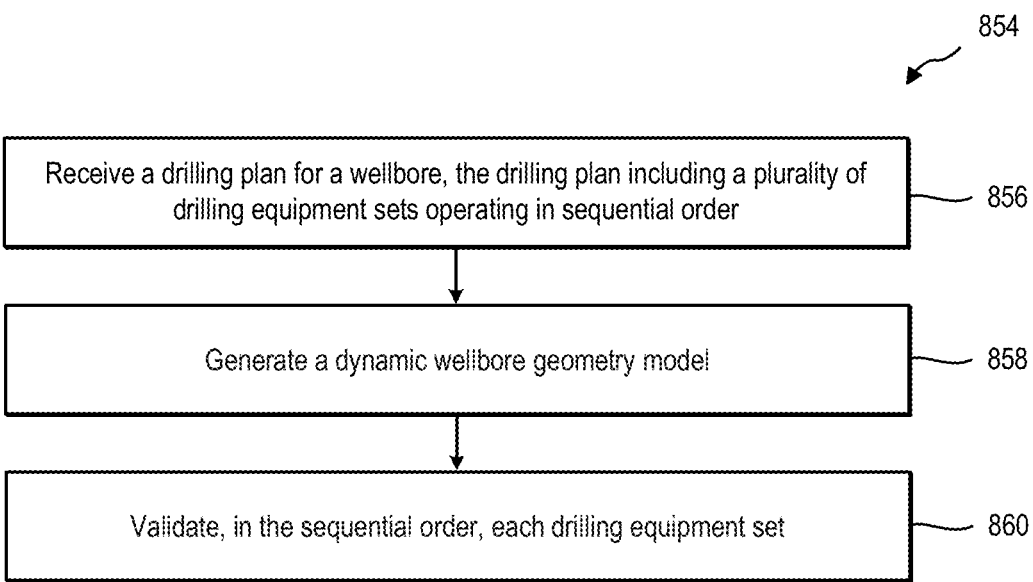
FIG. 8 illustrates a flowchart of a method for validating a drilling plan, in accordance with one at least one embodiment of the present disclosure.

FIG. 7 and FIG. 8, the corresponding text, and the examples provide a number of different methods, systems, devices, and computer-readable media of the drilling model validation engine, such as the drilling model validation engine 634 of FIG. 6. In addition to the foregoing, one or more embodiments may also be described in terms of flowcharts comprising acts for accomplishing a particular result, as shown in FIG. 7 and FIG. 8. FIG. 7 and FIG. 8 may be performed with more or fewer acts. Further, the acts may be performed in differing orders. Additionally, the acts described herein may be repeated or performed in parallel with one another or parallel with different instances of the same or similar acts.

FIG. 7 illustrates a flowchart of method 744, or a series of acts for validating a drilling plan, in accordance with one at least one embodiment of the present disclosure. While FIG. 7 illustrates acts according to one embodiment, alternative embodiments may omit, add to, reorder, and/or modify any of the acts shown in FIG. 7. The acts of FIG. 7 may be performed as part of a method. Alternatively, a computer-readable medium may comprise instructions that, when executed by one or more processors, cause a computing device to perform the acts of FIG. 7. In some embodiments, a system may perform the acts of FIG. 7.

The drilling model validation engine may receive first drilling equipment properties for a first plurality of drilling equipment used in a section of a wellbore at 746. The drilling model validation engine may receive the drilling equipment properties from any source. For example, the drilling model validation engine may receive the drilling equipment properties from a drilling plan provided by the drill planners. The first plurality of drilling equipment may be a drilling equipment set. In some embodiments, the first drilling equipment properties may include any drilling equipment properties, such as equipment diameter, drilling parameters, equipment properties, any other drilling equipment properties, and combinations thereof.

The drilling model validation engine may identify first wellbore properties for the section of the wellbore based on the first drilling equipment properties at 748. The first wellbore properties may include any wellbore properties, such as wellbore diameter, formation information, casing information, any other wellbore properties, and combinations thereof.

The drilling model validation engine may receive a second drilling equipment properties for a second plurality of drilling equipment used in the section of the wellbore at 750. The second plurality of drilling equipment may be different than the first plurality of drilling equipment. In some embodiments, the second drilling equipment properties may be different than the first drilling equipment properties.

The drilling model validation engine may validate that the second plurality of drilling equipment is usable in the section of the wellbore at 752 based at least in part on a comparison between the second drilling equipment properties and the first wellbore properties. For example, the drilling model validation engine may compare the equipment diameter of the second plurality of drilling equipment to the wellbore diameter of the section of the wellbore.

As discussed herein, in some embodiments, validating the second plurality of equipment may include generating a validation score for the second plurality of drilling equipment. The validation score may be representative of how good of a fit the second plurality of drilling equipment is for the section of the wellbore.

In some embodiments, the drilling model validation engine may identify second wellbore properties for the section of the wellbore based on the second drilling equipment properties. In this manner, the drilling model validation engine may generate a dynamic wellbore geometry model using wellbore properties generated from each of the drilling equipment properties.

FIG. 8 illustrates a flowchart of method 854, or a series of acts for validating a drilling plan, in accordance with one at least one embodiment of the present disclosure. While FIG. 8 illustrates acts according to one embodiment, alternative embodiments may omit, add to, reorder, and/or modify any of the acts shown in FIG. 8. The acts of FIG. 8 may be performed as part of a method. Alternatively, a computer-readable medium may comprise instructions that, when executed by one or more processors, cause a computing device to perform the acts of FIG. 8. In some embodiments, a system may perform the acts of FIG. 8.

A drilling model validation engine may receive a drilling plan for a wellbore at 856. The drilling plan may include a plurality of drilling equipment sets that operate in a sequential order to drill the wellbore. The drilling model validation engine may generate a dynamic wellbore geometry model for the wellbore at 858. The dynamic wellbore geometry model may include a plurality of states. Each state may be associated with an associated drilling equipment set used to drill or otherwise operate that particular state or portion of the wellbore. In some embodiments, each state of the plurality of states has a state wellbore diameter based on an associated equipment diameter of the associated drilling equipment set. In some embodiments, the associated drilling equipment set may be associated with a single state of the entire drilling plan. In some embodiments, the associated drilling equipment set may be associated with multiple states of the drilling plan. In some embodiments, the associated drilling equipment set may be associated with a single section of the dynamic wellbore geometry model. In some embodiments, the associated drilling equipment set may be associated with each of the sections of a particular state of the dynamic wellbore geometry model.

The drilling model validation engine may validate, in sequential order, each drilling equipment set at 860. For example, the drilling model validation engine may compare a state of the dynamic wellbore geometry model with a drilling equipment set that operates in that state. In some embodiments, as discussed herein, the drilling model validation engine may prepare a validation for each drilling equipment set in each state of the dynamic wellbore geometry model.

Figure 9:
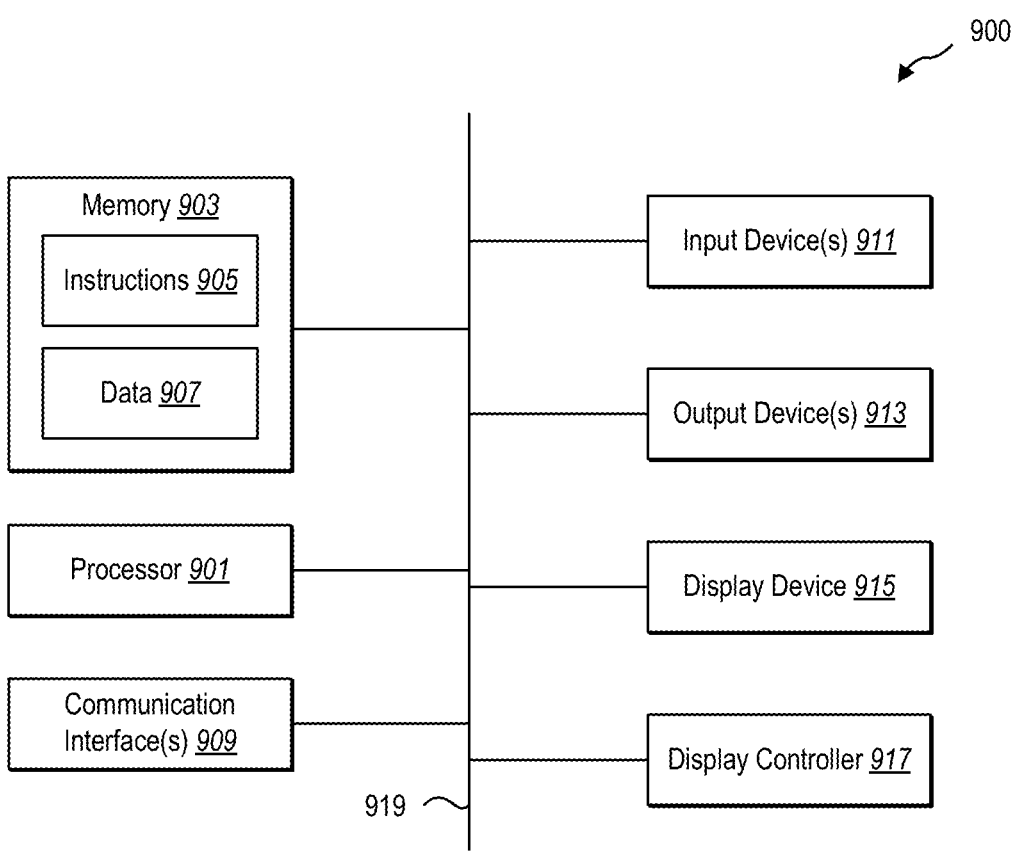
FIG. 9 illustrates certain components that may be included within a computer system, in accordance with at least one embodiment of the present disclosure.

FIG. 9 illustrates certain components that may be included within a computer system 900. One or more computer systems 900 may be used to implement the various devices, components, and systems described herein.

The computer system 900 includes a processor 901. The processor 901 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

INDUSTRIAL APPLICABILITY

The following description from ¶¶[0092]-[0112] includes various embodiments that, where feasible, may be combined in any permutation. For example, the embodiment of ¶[0092] may be combined with any or all embodiments of the following paragraphs. Embodiments that describe acts of a method may be combined with embodiments that describe, for example, systems and/or devices. Any permutation of the following paragraphs is considered to be hereby disclosed for the purposes of providing "unambiguously derivable support" for any claim amendment based on the following paragraphs. Furthermore, the following paragraphs provide support such that any combination of the following paragraphs would not create an "intermediate generalization."

In some embodiments, a method for drill planning includes receiving first drilling equipment properties for a first plurality of drilling equipment used in a section of a wellbore, based on the first drilling equipment properties, identifying first wellbore properties for the section of the wellbore, receiving second drilling equipment properties for a second plurality of drilling equipment used in the section of the wellbore, and validating that the second plurality of drilling equipment is usable in the section of the wellbore based at least in part on a comparison between the second drilling equipment properties and the first wellbore properties.

In some embodiments, validating includes generating a validation score for the second plurality of drilling equipment.

In some embodiments, the first drilling equipment properties includes a first equipment diameter and the first wellbore properties includes a first wellbore diameter for the section, the first wellbore diameter is based on the first equipment diameter, and the second plurality of drilling equipment includes a second equipment diameter, and generating the validation score includes comparing the second equipment diameter to the first wellbore diameter.

In some embodiments, the method includes determining that the second equipment diameter is less than the first wellbore diameter, and that generating the validation score includes generating a positive validation score for the second plurality of drilling equipment based on the determination.

In some embodiments, the method includes determining that the second equipment diameter is within a threshold, and that generating the validation score includes generating a caution validation score for the second plurality of drilling equipment based on the determination.

In some embodiments, the method includes determining that the second equipment diameter is greater than the first wellbore diameter, and that generating the validation score includes generating a negative validation score for the second plurality of drilling equipment based on the determination.

In some embodiments, the method includes determining drilling parameters based on the second drilling equipment properties and the first wellbore properties, and wherein generating the validation score includes generating the validation score based on a comparison of the drilling parameters with operating thresholds of the second plurality of drilling equipment.

In some embodiments, the method includes based on the second drilling equipment properties, identifying second wellbore properties for the section of the wellbore.

In some embodiments, a method for drill planning includes receiving a drilling plan for a wellbore, the drilling plan including a plurality of drilling equipment sets operating in a sequential order, generating a dynamic wellbore geometry model, the dynamic wellbore geometry model including a plurality of states based on the plurality of drilling equipment sets, each state of the plurality of states associated with an associated drilling equipment set of the plurality of drilling equipment sets, and validating, in the sequential order, each drilling equipment set of the plurality of drilling equipment sets based on a comparison between a state of the plurality of states and a drilling equipment set of the plurality of drilling equipment sets that operates in the state of the plurality of states.

In some embodiments, validating includes generating a validation score for each drilling equipment set of the plurality of drilling equipment sets, the validation score representative of whether the drilling equipment set is usable in the wellbore based on the dynamic wellbore geometry model.

In some embodiments, each drilling equipment set of the plurality of drilling equipment sets has an equipment diameter, and each state of the plurality of states has a state wellbore diameter based on associated equipment diameter of the associated drilling equipment set of the plurality of drilling equipment sets.

In some embodiments, generating the validation score includes generating the validation score based on a comparison between a proceeding equipment diameter of a proceeding drilling equipment set of the plurality of drilling equipment sets and the state wellbore diameter of the state of the plurality of states in which the proceeding drilling equipment set operates.

In some embodiments, validating includes validating a proceeding drilling equipment set of the plurality of drilling equipment sets with a state of the plurality of states.

In some embodiments, a computing system includes a processor and memory, the memory including instructions accessible by the processor to cause the processor to receive first drilling equipment properties for a first plurality of drilling equipment used in a section of a wellbore, based on the first drilling equipment properties, identify first wellbore properties for the section of the wellbore, receive second drilling equipment properties for a second plurality of drilling equipment used in the section of the wellbore, and validate that the second plurality of drilling equipment is usable in the section of the wellbore based at least in part on a comparison between the second drilling equipment properties and the first wellbore properties.

In some embodiments, validating includes generating a validation score for the second plurality of drilling equipment.

In some embodiments, the first drilling equipment properties include a first equipment diameter and the first wellbore properties include a first wellbore diameter for the section, the first wellbore diameter is based on the first equipment diameter, and the second plurality of drilling equipment includes a second equipment diameter, and generating the validation score includes comparing the second equipment diameter to the first wellbore diameter.

In some embodiments, the instructions further cause the processor to determine that the second equipment diameter is less than the first wellbore diameter, and that generating the validation score includes generating a positive validation score for the second plurality of drilling equipment based on the determination.

In some embodiments, the instructions further cause the processor to determine that the second equipment diameter is within a threshold, and that generating the validation score includes generating a caution validation score for the second plurality of drilling equipment based on the determination.

In some embodiments, the instructions further cause the processor to determine that the second equipment diameter is greater than the first wellbore diameter, and generating the validation score includes generating a negative validation score for the second plurality of drilling equipment based on the determination.

In some embodiments, the instructions further cause the processor to determine drilling parameters, based on the second drilling equipment properties and the first wellbore properties, and that generating the validation score includes generating the validation score based on a comparison of the drilling parameters with operating thresholds of the second plurality of drilling equipment.

The embodiments of drilling model validation engines have been primarily described with reference to wellbore drilling operations; the drilling model validation engines described herein may be used in applications other than the drilling of a wellbore. In other embodiments, drilling model validation engines, according to the present disclosure, may be used outside a wellbore or other downhole environment used for the exploration or production of natural resources. For instance, drilling model validation engines of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

drilling a section of a wellbore using a first plurality of drilling equipment coupled to a drill string, the first plurality of drilling equipment comprising a drill bit coupled to the drill string and a measure while drilling (MWD) tool coupled to the drill string, the MWD tool comprising a drilling model validation engine;

receiving, via the drilling model validation engine of the MWD tool, first drilling equipment properties for the first plurality of drilling equipment used in the section of the wellbore, the first drilling equipment properties including a first equipment diameter defined by the drill bit;

based on the first drilling equipment properties, identifying, via the drilling model validation engine of the MWD tool, first wellbore properties for the section of the wellbore, the first wellbore properties comprising a first wellbore diameter of the section, the first wellbore diameter based on the first equipment diameter;

receiving, via the drilling model validation engine of the MWD tool, second drilling equipment properties for a second plurality of drilling equipment coupled to the drill string, the second plurality of drilling equipment comprising a reamer and a rotary steerable system (RSS) coupled to the reamer and in electrical communication with the drilling model validation engine of the MWD tool, the second drilling equipment properties comprising a second equipment diameter defined by the reamer, the second equipment diameter being different than the first equipment diameter;

validating, via the drilling model validation engine of the MWD tool, that the second plurality of drilling equipment is usable in the section of the wellbore based at least in part on a comparison between the second drilling equipment properties and the first wellbore properties, wherein:

validating that the second plurality of drilling equipment is usable in the section of the wellbore comprises generating, via the drilling model validation engine of the MWD tool, a validation score for the second plurality of drilling equipment and determining, via the drilling model validation engine of the MWD tool, the validation score exceeds a predetermined validation threshold; and generating the validation score comprises comparing the second equipment diameter to the first wellbore diameter; and drilling the section of the wellbore based on the validation score and using the reamer of the second plurality of drilling equipment guided by the RSS.

2. The method of claim 1, further comprising:

receiving third drilling equipment properties for a third plurality of drilling equipment comprising a casing liner installer, the third drilling equipment properties comprising a third equipment diameter defined by the casing liner installer, the third equipment diameter being different than the first equipment diameter; and validating that the third plurality of drilling equipment is usable in the section of the wellbore based at least in part on a comparison between the third drilling equipment properties and the first wellbore properties.

3. The method of claim 1, further comprising determining that the second equipment diameter is less than the first wellbore diameter, and wherein generating the validation score includes generating a positive validation score for the second plurality of drilling equipment based on the determination.

4. The method of claim 3, further comprising determining that the second equipment diameter is within a diameter threshold, and wherein generating the validation score includes generating a caution validation score for the second plurality of drilling equipment based on the determination.

5. The method of claim 1, further comprising determining that the second equipment diameter is greater than the first wellbore diameter, and wherein generating the validation score includes generating a negative validation score for the second plurality of drilling equipment based on the determination.

6. The method of claim 1, further comprising determining drilling parameters based on the second drilling equipment properties and the first wellbore properties, and wherein generating the validation score includes generating the validation score based on a comparison of the drilling parameters with operating thresholds of the second plurality of drilling equipment.

7. The method of claim 1, further comprising, based on the second drilling equipment properties, identifying second wellbore properties for the section of the wellbore.

8. A system, comprising:

a drill string;

a measure while drilling (MWD) tool couplable to the drill string and comprising a drilling model validation engine;

a first plurality of drilling equipment couplable to the drill string and comprising a drill bit;

a second plurality of drilling equipment couplable to the drill string and comprising a reamer and a rotary steerable system (RSS) coupled to the drill string and in electrical communication with the drilling model validation engine of the MWD tool; and a processor and memory, the memory including instructions accessible by the processor to cause the processor to:

receive, via the drilling model validation engine of the MWD tool, first drilling equipment properties for the first plurality of drilling equipment used in a section of a wellbore, the first drilling equipment properties comprising a first equipment diameter defined by the drill bit;

based on the first drilling equipment properties, identify, via the drilling model validation engine of the MWD tool, first wellbore properties for the section of the wellbore, the first wellbore properties comprising a first wellbore diameter for the section, the first wellbore diameter based on the first equipment diameter;

receive, via the drilling model validation engine of the MWD tool, second drilling equipment properties for the second plurality of drilling equipment used in the section of the wellbore, the second drilling equipment properties comprising a second equipment diameter defined by the reamer;

validate, via the drilling model validation engine of the MWD tool, that the second plurality of drilling equipment is usable in the section of the wellbore based at least in part on a comparison between the second drilling equipment properties and the first wellbore properties, wherein:

validating that the second plurality of drilling equipment is usable in the section of the wellbore comprises generating, via the drilling model validation engine of the MWD tool, a validation score for the second plurality of drilling equipment and determining, via the drilling model validation engine of the MWD tool, the validation score exceeds a predetermined validation threshold; and generating the validation score comprises comparing the second equipment diameter to the first wellbore diameter; and drill the section of the wellbore based on the validation score and using the reamer of the second plurality of drilling equipment guided by the RSS.

9. The system of claim 8, wherein the instructions further cause the processor to determine that the second equipment diameter is less than the first wellbore diameter, and wherein generating the validation score includes generating a positive validation score for the second plurality of drilling equipment based on the determination.

10. The system of claim 9, wherein the instructions further cause the processor to determine that the second equipment diameter is within a diameter threshold, and wherein generating the validation score includes generating a caution validation score for the second plurality of drilling equipment based on the determination.

11. The system of claim 9, wherein the instructions further cause the processor to determine that the second equipment diameter is greater than the first wellbore diameter, and wherein generating the validation score includes generating a negative validation score for the second plurality of drilling equipment based on the determination.

12. The system of claim 9, wherein the instructions further cause the processor to determine drilling parameters, based on the second drilling equipment properties and the first wellbore properties, and wherein generating the validation score includes generating the validation score based on a comparison of the drilling parameters with operating thresholds of the second plurality of drilling equipment.

\* \* \* \* \*